(12) United States Patent
Na et al.

(10) Patent No.: US 9,106,361 B2
(45) Date of Patent: Aug. 11, 2015

(54) PASSIVE WAVELENGTH DIVISION MULTIPLEXING DEVICE FOR AUTOMATIC WAVELENGTH LOCKING AND SYSTEM THEREOF

(75) Inventors: Ki-Woon Na, Gyeonggi-do (KR);
Woo-Jin Lee, Gyeonggi-do (KR);
Kwon-Hoon Han, Seoul (KR);
Seung-Rog Choi, Seoul (KR);
Tae-Hyeong Kim, Seoul (KR);
Young-Ouk Noh, Gyeonggi-do (KR)

(73) Assignees: SOLID, INC. (KR); SOLID SYSTEMS, INC. (KR); CHEMOPTICS, INC. (KR)

( * ) Notice: Subject to any disclaimer, the term of this patent is extended or adjusted under 35 U.S.C. 154(b) by 113 days.

(21) Appl. No.: 13/988,837

(22) PCT Filed: Nov. 30, 2010

(86) PCT No.: PCT/KR2010/008506
§ 371 (c)(1),
(2), (4) Date: Aug. 13, 2013

(87) PCT Pub. No.: WO2012/074146
PCT Pub. Date: Jun. 7, 2012

(65) Prior Publication Data
US 2013/0315585 A1 Nov. 28, 2013

(51) Int. Cl.
*H04J 14/02* (2006.01)
*H04B 10/50* (2013.01)
*H04B 10/572* (2013.01)

(52) U.S. Cl.
CPC .............. *H04J 14/02* (2013.01); *H04B 10/506* (2013.01); *H04B 10/50575* (2013.01); *H04B 10/572* (2013.01); *H04J 14/0228* (2013.01); *H04J 14/0272* (2013.01); *H04J 14/0282* (2013.01)

(58) Field of Classification Search
CPC .................... H04B 10/5057; H04B 10/50575; H04B 10/506; H04B 10/572; H04J 14/0272; H04J 14/0228; H04J 14/0282
USPC ........................................................ 398/95
See application file for complete search history.

(56) References Cited

U.S. PATENT DOCUMENTS 6,661,974 B1 * 12/2003 Akiyama et al. ................ 398/95
7,079,772 B2 * 7/2006 Graves et al. ................... 398/95

(Continued)

FOREIGN PATENT DOCUMENTS

CN 101630976 A 1/2010
JP 2003222671 A 8/2003

(Continued)

OTHER PUBLICATIONS

Chinese Office Action of Corresponding Chinese Application No. 201080070411.8, Dated Feb. 25, 2015.

*Primary Examiner* — Leslie Pascal
(74) *Attorney, Agent, or Firm* — Fay Sharpe LLP

(57) ABSTRACT

The present invention relates to a passive wavelength division multiplexing device for automatic wavelength locking and a system thereof including an optical multiplexer, an optical filter, an integrated optical receiver monitor, and a tunable optical transmitter. Through wavelength locking that adjusts a wavelength of an optical signal, which changes according to an external environment such as a temperature change, into a wavelength of an optical signal having the maximum optical intensity, communication quality may be maximized by securing a stable communication channel, a locking time and a communication channel setting time may be reduced, and more robust locking may be guaranteed.

3 Claims, 4 Drawing Sheets

(56) References Cited

U.S. PATENT DOCUMENTS

| | | | |
|---|---|---|---|
| 8,036,534 B2* | 10/2011 | Matsumoto | 398/95 |
| 8,340,525 B2* | 12/2012 | Bai et al. | 398/95 |
| 8,611,750 B2* | 12/2013 | Lei et al. | 398/95 |
| 8,693,872 B2* | 4/2014 | Wu et al. | 398/79 |
| 2002/0048063 A1* | 4/2002 | Jung et al. | 359/124 |
| 2002/0063922 A1* | 5/2002 | Berger et al. | 359/124 |
| 2003/0115015 A1 | 6/2003 | Kosowsky et al. | |
| 2005/0123300 A1 | 6/2005 | Kim et al. | |
| 2009/0232493 A1* | 9/2009 | Tu | 398/17 |
| 2010/0142572 A1* | 6/2010 | Chen et al. | 372/29.02 |
| 2011/0158651 A1* | 6/2011 | Tang et al. | 398/98 |

FOREIGN PATENT DOCUMENTS

| | | |
|---|---|---|
| JP | 2004221267 A | 8/2004 |
| KR | 10-2000-0049867 | 8/2000 |
| KR | 10-2009-0023838 | 6/2009 |
| KR | 10-2009-0110565 | 10/2009 |
| KR | 10-2010-0111038 | 10/2010 |

* cited by examiner

PASSIVE WAVELENGTH DIVISION MULTIPLEXING DEVICE FOR AUTOMATIC WAVELENGTH LOCKING AND SYSTEM THEREOF

CROSS-REFERENCE TO RELATED APPLICATION

This application is a Section 371 National Stage Application of International Application No. PCT/KR2010/008506, filed Nov. 30, 2010, the contents of which are hereby incorporated by reference in their entirety.

FIELD OF THE INVENTION

The present invention relates to a passive wavelength division multiplexing device for automatic wavelength locking. More particularly, the present invention relates to a passive wavelength division multiplexing device for automatic wavelength locking, in which communication quality can be maximized by securing a stable communication channel through transmission and reception of an optical signal that is always optimized irrespective of an external environment by performing wavelength locking or wavelength stabilization that adjusts a wavelength of an optical signal, which varies depending on an external environment such as a temperature change, into a wavelength of an optical signal having the maximum optical intensity in transmission and reception of an optical signal between a tunable optical transceiver (T-TRX) of an optical line terminal (OLT) and a tunable optical transceiver (T-TRX) of an optical network unit (ONU), which are included in a wavelength division multiplexing passive optical network (WDM-PON)

BACKGROUND OF THE INVENTION

Conventionally, the improvement of a transmission capacity of a subscriber network is required due to the Internet and multimedia communication traffics along with the advancement of information technology (IT). As one of technologies of improving the transmission capacity of a subscriber network, a wavelength division multiplexing passive optical network (WDM-PON) comes into the spotlight.

FIG. 1 is a view illustrating the configuration of the entire network of a conventional wavelength division multiplexing passive optical network (WDM-PON) according to the prior art, and FIG. 2 is a view illustrating the optical transmittance characteristics of an optical demultiplexer (ODMX) of an optical line terminal (OLT) and an optical demultiplexer (ODMX) of an remote node (RN) according to the prior art.

As shown in FIG. 1, the conventional wavelength division multiplexing passive optical network (WDM-PON) includes an optical line terminal (OLT) 100, a remote node (RN) 150, and a plurality of optical network units (ONUs) 160a, 160b, ..., 160n.

The optical line terminal (OLT) 100 includes N channel cards. In FIG. 1, for the sake of convenience of explanation, there is described the case where the optical line terminal 100 includes six channel cards and the number of the optical network units (ONUs) are six. That is, the optical line terminal (OLT) 100 includes first to sixth channel cards 111a to 111n. In addition, the optical line terminal (OLT) 100 includes a first optical demultiplexer (ODMX) 112.

The remote node (RN) 150 is connected to the optical line terminal (OLT) 100 through a single optical line 130, and includes a second optical demultiplexer (ODMX) 151. First to sixth optical network units (ONUs) 160a to 160n are respectively connected to the second optical demultiplexer (ODMX) 151 of the remote node (RN) 150 through the single optical line 130.

Since the wavelength division multiplexing passive optical network (WDM-PON) employs different optical wavelength according to the respective channels, it can be implemented based on a principle that although the same optical line is used, respective optical signals are not influenced by each other. In FIG. 1, if it is assumed that the optical transmittance characteristics of the first optical demultiplexer (ODMX) 112 of the optical line terminal (OLT) 100 and the second optical demultiplexer (ODMX) 151 of the remote node (RN) 150 is the same as that shown in FIG. 2, in the case where the wavelengths of downward optical signals that are respectively transmitted to the first to sixth optical network units (ONUs) 160a to 160n from the optical line terminal (OLT) 100 are $\lambda 1d$ to $\lambda 6d$, and the wavelengths of upward optical signals that are respectively transmitted to the optical line terminal (OLT) 100 from the first to sixth optical network units (ONUs) 160a to 160n are $\lambda 1u$ to $\lambda 6u$, the wavelength division multiplexing passive optical network (WDM-PON) is implemented based on a principle that six independent communication channels are formed between the optical line terminal (OLT) 100 and the first to sixth optical network units (ONUs) 160a to 160n.

In order for the wavelength division multiplexing passive optical network (WDM-PON) to be operated normally, it is important that the wavelengths $\lambda 1d$ to $\lambda 6d$ of the downward optical signals that are respectively transmitted to the first to sixth optical network units (ONUs) 160a to 160n from the optical line terminal (OLT) 100, and the wavelengths $\lambda 1u$ to $\lambda 6u$ of the upward optical signals that are respectively transmitted to the optical line terminal (OLT) 100 from the first to sixth optical network units (ONUs) 160a to 160n be identical to or be not deviated by a certain level from the center wavelengths for the respective channels in the optical transmittance characteristics of the first optical demultiplexer (ODMX) 112 and the second optical demultiplexer (ODMX) 151, which are shown in FIG. 2. That is, it is indispensable in which the wavelengths of the downward optical signal of the optical line terminal (OLT) 100 and the wavelengths of the upward optical signals of the first to sixth optical network units (ONUs) 160a to 160n be fixed so as to be prevented from being moved in position.

A tunable optical transceiver (T-TRX) used in either the optical line terminal (OLT) 100 or the first to sixth optical network units (ONUs) 160a to 160n has a tendency in which an output optical wavelength is easily changed by a factor such as a temperature change of external air. In the case where the tunable optical transceiver (T-TRX) is deviated from a predetermined wavelength position by an external factor such as a temperature change of external air, communication is interrupted or an interference occurs between the optical wavelength and a wavelength of another channel, resulting in a serious deterioration of communication quality.

Therefore, there is a need for development of a technology that can implement wavelength locking or wavelength stabilization of a light source used in the wavelength division multiplexing passive optical network (WDM-PON) in a simpler and more effective manner.

To this end, an invention of Korean Patent application No. 10-2007-0088904 entitled "Wavelength Tunable Passive Optical Subscriber Network and Wavelength Control Method thereof" has been proposed. However, such a proposed Korean Patent entails a problem in that a locking time is long, communication may not be carried out due to incorrect wavelength, and a communication connection is established while both the OLT and ONU perform a slow optical scanning operation, leading to an increase in the communication channel setting time.

DETAILED DESCRIPTION OF THE INVENTION

Technical Problems

Accordingly, the present invention was made to solve the aforementioned problem occurring in the prior art, and it is an object of the present invention to provide a passive wavelength division multiplexing device for automatic wavelength locking, in which communication quality can be maximized by securing a stable communication channel through transmission and reception of an optical signal that is always optimized irrespective of an external environment, a locking time and a communication channel setting time can be reduced, and more robust locking can be guaranteed through wavelength locking or wavelength stabilization that adjusts a wavelength of an optical signal, which varies depending on an external environment such as a temperature change, into a wavelength of an optical signal having the maximum optical intensity in transmission and reception of an optical signal between a tunable optical transceiver (T-TRX) of an optical line terminal (OLT) and a tunable optical transceiver (T-TRX) of an optical network unit (ONU), which are included in a wavelength division multiplexing passive optical network (WDM-PON), and a system thereof.

Technical Solution

To accomplish the above object, in accordance with one aspect of the present invention, there is provided a passive wavelength division multiplexing device for automatic wavelength locking, including: an optical multiplexer configured to allow a light having a corresponding wavelength to be outputted to a plurality of optical network units (ONUs) when a predetermined wavelength of a light beam inputted thereto is synchronized to a passband thereof; a splitter configured to split a part of the light outputted from the optical multiplexer into a plurality of light beams; an optical filter configured to allow the light beams splitted by the splitter to pass therethrough; an integrated optical receiver monitor configured to detect the intensity of the light beams that has passed through the optical filter and convert the detected light beams into electrical signals; and a wavelength-tunable optical transmitter configured to allow a light beam having a specific wavelength to be inputted to the optical multiplexer while scanning the plurality of light beams having different wavelengths according to a temperature, and adjust a wavelength of an optical signal to be outputted to the optical network units (ONUs) through the optical multiplexer, into a wavelength of an optical signal having the maximum optical intensity to lock the wavelength using optical intensity information corresponding to the electrical signals converted by the integrated optical receiver monitor.

Preferably, the passive wavelength division multiplexing device for automatic wavelength locking may further include: an FSK Tx section configured to transmit its locked wavelength information using a frequency shift keying (FSK) signal or a subcarrier which is carried on the amplitude of payload data within a given percentage; a first photo detection section configured to detect the intensity of a light having a specific wavelength transferred thereto from the optical network unit (ONU) through monitoring; and a first polymer optical sub-assembly ("OSA") section configured to transmit the light having the specific wavelength detected by the first photo detection section using a polymer optical sub-assembly.

Also, preferably, the wavelength-tunable optical transmitter may include: a light scanning unit configured to allow a light beam having a specific wavelength to be inputted to the optical multiplexer while scanning a plurality of light beams having different wavelengths according to a temperature; and a wavelength locking unit configured to adjust a wavelength of an optical signal to be outputted to the optical network units (ONUs) through the optical multiplexer, into a wavelength of an optical signal having the maximum optical intensity to lock the wavelength using optical intensity information corresponding to the electrical signals converted by the integrated optical receiver monitor.

To accomplish the above object, in accordance with another aspect of the present invention, there is provided a passive wavelength division multiplexing system for automatic wavelength locking, including an optical line terminal (OLT), one or more optical network units (ONUs) including a light source in which a lasing wavelength of a laser is adjusted by the thermo-optic effect, and a wavelength routing network for interconnecting the optical line terminal (OLT) and the optical network units (ONUs) through a single optical line, wherein the optical line terminal (OLT) includes: an FSK Tx section configured to transmit its locked wavelength information using a frequency shift keying (FSK) signal which is carried on the amplitude of payload data within a given percentage (e.g., 10%); a first photo detection section configured to detect the intensity of a light having a specific wavelength transferred thereto from the optical network unit (ONU) through monitoring; and a first polymer optical sub-assembly section configured to transmit the light having the specific wavelength detected by the first photo detection section using a polymer optical sub-assembly, and wherein each of the optical network units (ONUs) includes: a second photo detection section configured to receive the playload data from the optical line terminal (OLT) and convert the received playload data into an electrical signal; an FSK Rx section configured to detect only an FSK signal from the data into the electrical signal in the second photo detection section to extract the locked wavelength information; and a second polymer optical sub-assembly section configured to transmit a light having a specific wavelength to the optical line terminal (OLT) while tuning a wavelength based on the locked wavelength information extracted in the FSK Rx section.

Advantageous Effect

The present invention has advantageous effects in that communication quality can be maximized by securing a stable communication channel through transmission and reception of an optical signal that is always optimized irrespective of an external environment, a locking time and a communication channel setting time can be reduced, and more robust locking can be guaranteed through wavelength locking or wavelength stabilization that adjusts a wavelength of an optical signal, which varies depending on an external environment such as a temperature change, into a wavelength of an optical signal having the maximum optical intensity.

BRIEF DESCRIPTION OF THE INVENTION

The above objects, other features and advantages of the present invention will become more apparent by describing the preferred embodiments thereof with reference to the accompanying drawings, in which.

Figure 1:
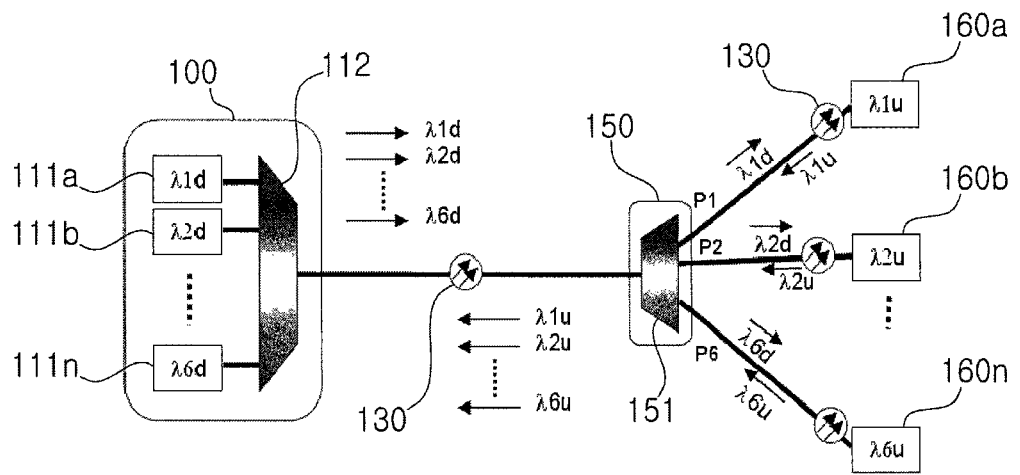
FIG. 1 is a view illustrating the configuration of the entire network of a conventional wavelength division multiplexing passive optical network (WDM-PON) according to the prior art.
Figure 2:
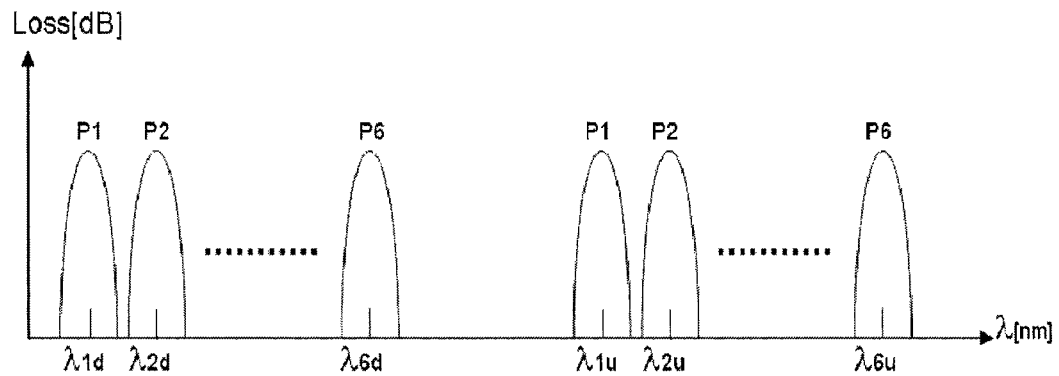
FIG. 2 is a view illustrating the optical transmittance characteristics of an optical demultiplexer (ODMX) of an optical line terminal (OLT) and an optical demultiplexer (ODMX) of an remote node (RN) according to the prior art.

Explanation on reference numerals
of main elements in the drawings *

301: optical multiplexer        302: splitter
303: optical filter             304: integrated optical receiver monitor
305: wavelength-tunable optical transmitter

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 3:
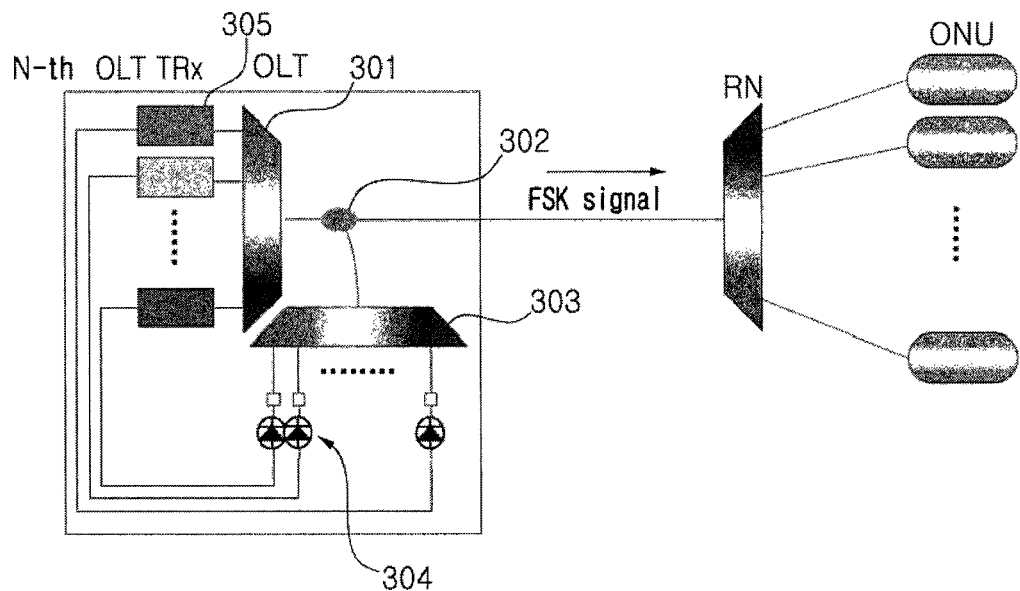
FIG. 3 is a block diagram illustrating the configuration of a passive wavelength division multiplexing device for automatic wavelength locking according to the present invention.

FIG. 3 is a block diagram illustrating the configuration of a passive wavelength division multiplexing device for automatic wavelength locking according to the present invention.

As show in FIG. 3, the passive wavelength division multiplexing device for automatic wavelength locking according to the present invention is configured such that an optical line terminal (OLT) stabilizes the wavelength of an optical signal and transmits the optical signal whose wavelength is stabilized to optical network units (ONUs). Specifically, the passive wavelength division multiplexing device according to the present invention includes an optical multiplexer 301, a splitter 302, an optical filter 303, an integrated optical receiver monitor 304, and a wavelength-tunable optical transmitter 305, which are built in an optical line terminal (OLT).

That is, the passive wavelength division multiplexing device for automatic wavelength locking includes: an optical multiplexer 301 that allows a light having a corresponding wavelength to be outputted to a plurality of optical network units (ONUs) when a predetermined wavelength of a light beam inputted thereto from a wavelength-tunable optical transmitter 305 is synchronized to a passband thereof; a splitter 302 that splits a part of the light outputted from the optical multiplexer 301 into a plurality of light beams; an optical filter 303 that allows the light beams splitted by the splitter 302 to pass therethrough; an integrated optical receiver monitor 304 that detects the intensity of the light beams that has passed through the optical filter 303 and converts the detected light beams into electrical signals; and a wavelength-tunable optical transmitter 305 that allows a light beam having a specific wavelength to be inputted to the optical multiplexer 301 while scanning the plurality of light beams having different wavelengths according to a temperature, and adjusts a wavelength of an optical signal to be outputted to the optical network units (ONUS) through the optical multiplexer 301, into a wavelength of an optical signal having the maximum optical intensity to lock the wavelength using optical intensity information corresponding to the electrical signals converted by the integrated optical receiver monitor 304.

Herein, the wavelength-tunable optical transmitter 305 allows a light beam having a specific wavelength to be inputted to the optical multiplexer 301 while scanning, i.e., slowly alternately scanning a plurality of light beams having different wavelengths (e.g., $\lambda 1, \lambda 2, \lambda 3, \ldots, \lambda n$) according to a temperature (e.g., T1, T2, T3, ... ). In the process of slowly alternately scanning the plurality of light beams, when a specific wavelength is positioned in a passband of the optical multiplexer 301, the optical multiplexer 301 outputs a light having a predetermined wavelength. Then, the integrated optical receiver monitor 304 detects the optical intensity the light beams that are splitted from a part (i.e., approximately 1%) of the light by the splitter 302 and are passed through the optical filter 303. Thereafter, the wavelength-tunable optical transmitter 305 adjusts a wavelength of an optical signal to be outputted to the optical network units (ONUS) through the optical multiplexer 301, into a wavelength of an optical signal having the maximum optical intensity to lock the wavelength using the detected optical intensity information.

Specifically, the wavelength-tunable optical transmitter 305 includes a light scanning unit (not shown) that allows a light beam having a specific wavelength to be inputted to the optical multiplexer 301 while scanning a plurality of light beams having different wavelengths according to a temperature, and a wavelength locking unit (not shown) that adjusts a wavelength of an optical signal to be outputted to the optical network units (ONUs) through the optical multiplexer 301, into a wavelength of an optical signal having the maximum optical intensity to lock the wavelength using optical intensity information corresponding to the electrical signals converted by the integrated optical receiver monitor 304.

The operation of the passive wavelength division multiplexing device for automatic wavelength locking according to the present invention having the above construction as shown in FIG. 3 will be described hereinafter.

First, when the wavelength-tunable optical transmitter 305 installed in the optical line terminal (OLT) is turned on, it scans a plurality of light beams having different wavelengths (e.g., $\lambda 1, \lambda 2, \lambda 3, \ldots, \lambda n$) according to a temperature (e.g., T1, T2, T3, ... ).

That is, the wavelength-tunable optical transmitter 305 allows a light beam having a specific wavelength to be inputted to the optical multiplexer 301 while slowly alternately scanning the plurality of light beams having different wavelengths.

Next, in the process of slowly alternately scanning the plurality of light beams, when a specific wavelength is positioned in a passband of the optical multiplexer 301, i.e., when a predetermined wavelength of light inputted thereto from a wavelength-tunable optical transmitter 305 is synchronized to the passband of the optical multiplexer 301, the optical multiplexer 301 outputs a light having a corresponding wavelength to a plurality of optical network units (ONUs).

Then, the splitter 302 splits a part (i.e., approximately 1%) of the light outputted from the optical multiplexer 301 into a plurality of light beams, which is in turn inputted to the optical filter 303. In this case, the optical filter 303 (e.g., an optical filter having the same optical transmittance characteristics as those of the optical multiplexer) allows the light beams splitted by the splitter 302 to pass therethrough, and the integrated optical receiver monitor 304 detects the intensity of the light beams that has passed through the optical filter 303 and converts the detected light beams into electrical signals, which are in turn inputted to the wavelength-tunable optical transmitter 305.

By doing so, the wavelength-tunable optical transmitter305 can adjust a wavelength of an optical signal to be outputted to the optical network units (ONUs) through the optical multiplexer 301, into a wavelength of an optical signal having the maximum optical intensity to lock the wavelength using the electrical signals, i.e., optical intensity information converted by the integrated optical receiver monitor 304

As described above, the present invention is constructed such that the wavelength-tunable optical transmitter allows a light beam having a specific wavelength to be inputted to the optical multiplexer while scanning, i.e., slowly alternately scanning a plurality of light beams having different wavelengths according to a temperature, and in the process of slowly alternately scanning the plurality of light beams, when a specific wavelength is positioned in a passband of the optical multiplexer 301 and a light having a predetermined wavelength is outputted from the optical multiplexer, the optical intensity the light beams is detected from a part (i.e., approximately 1%) of the outputted light and then the a wavelength of an optical signal to be outputted to the optical network units (ONUs) through the optical multiplexer is adjusted into a wavelength of an optical signal having the maximum optical intensity to lock the wavelength using the detected optical intensity information, so that a locking time and a communication channel setting time can be reduced, and more robust locking can be guaranteed.

Figure 4:
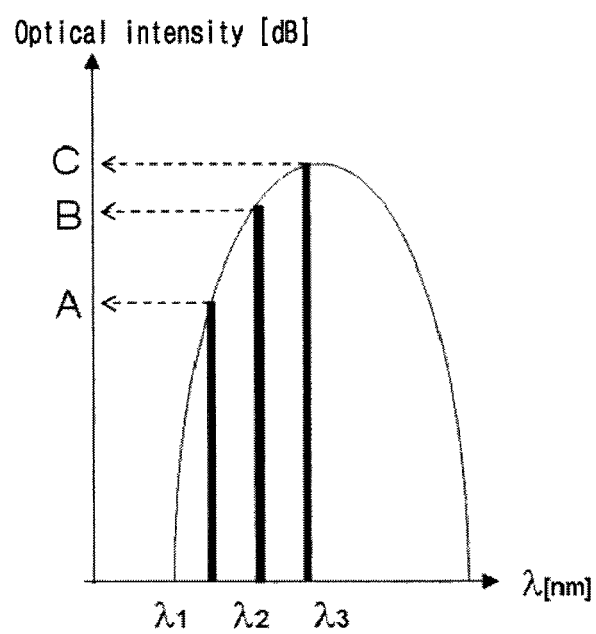
FIG. 4 is a graph illustrating the relationship between an optical wavelength and an optical intensity for wavelength locking according to the present invention.

FIG. 4 is a graph illustrating the relationship between an optical wavelength and an optical intensity for wavelength locking according to the present invention;

FIG. 4 shows how the optical intensity monitored in the passband is changed when the wavelength-tunable optical transmitter scans a plurality of light beams at its various different wavelengths according to a temperature change, i.e., alternately scanning the light beams at its various different wavelengths with varying a temperature.

As shown in FIG. 4, the wavelength-tunable optical transmitter according to the present invention monitors the optical intensities (i.e., A, B, and C) corresponding to the respective wavelengths $\lambda 1$, $\lambda 2$, and $\lambda 3$, when the respective wavelengths are, for example, $\lambda 1$, $\lambda 2$, and $\lambda 3$, so that its optical wavelength can be locked to the center of a passband of the optical multiplexer, i.e., a wavelength of an optical signal having the maximum optical intensity.

Figure 5A:
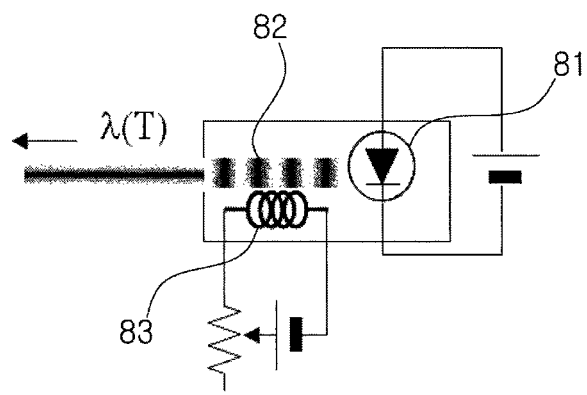
FIG. 5a is a view illustrating the configuration of an external cavity laser based on a polymer grating as one example of a wavelength-tunable light source according to the present invention.
Figure 5B:
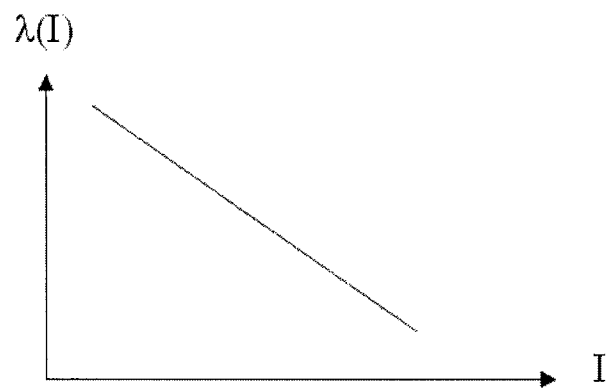
FIG. 5b is graph illustrating the relationship between a heat and an output wavelength of a heater according to the present invention.

FIG. 5*a* is a view illustrating the configuration of an external cavity laser based on a polymer grating as one example of a wavelength-tunable light source according to the present invention, and FIG. 5*b* is graph illustrating the relationship between a heat and an output wavelength of a heater according to the present invention.

As shown in FIG. 5*a*, an external cavity laser based on a polymer grating according to the present invention includes a polymer grating 82, a heater 83 that applies heat to the polymer grating, and a laser diode 81 having a first face formed of an anti-reflection (AR) coating layer so as to abut against the polymer grating. A second face corresponding to the first face of the laser diode 81 may be formed of a reflection coating layer having a reflectivity of 90% or more. The polymer grating 82 may have a first face formed a reflection coating layer having reflectivity of 90% or more so as to abut against the optical line and a second face formed of an anti-reflection (AR) coating layer so as to abut against the laser diode 81.

Thus, a laser resonance occurs between the first face of the polymer grating 82 and the second face of the laser diode 81 to output an optical signal having a specific wavelength. In particular, when the electric current applied to the heater 83 from the outside is changed, the heat of the heater 83 varies, and the characteristics (i.e., length) of the polymer grating 82 vary depending on the heat applied to the polymer grating 82, resulting in a substantial change in the distance between the first face of the polymer grating 82 and the second face of the laser diode 81 and resulting in a difference in the resonant length of a resonator by the thermo-optic effect, thereby varying a wavelength of light emitted from the laser diode 81. The heat and the output wavelength of the heater 83 are in an inverse-proportional relationship as shown in FIG. 5*b*.

Figure 6:
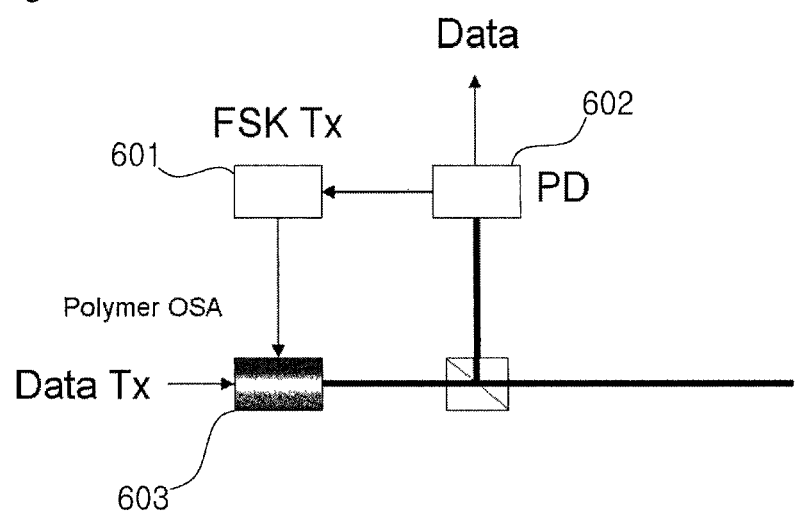
FIGS. 6 and 7 are views illustrating a passive wavelength division multiplexing system for automatic wavelength locking according to the present invention.
Figure 7:
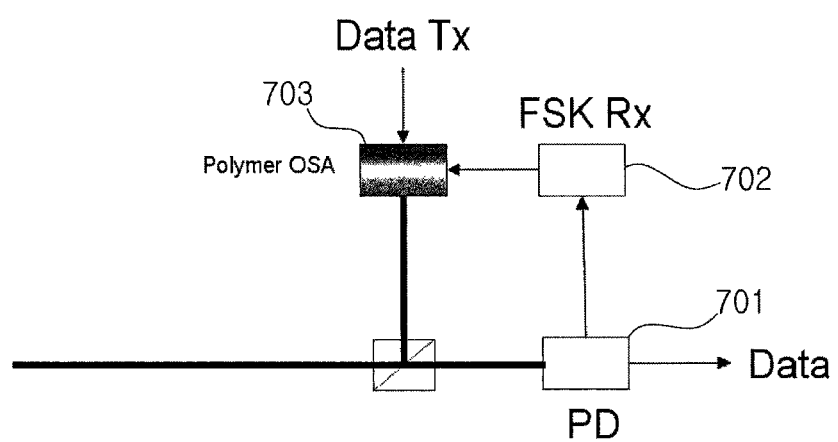

FIGS. 6 and 7 are views illustrating a passive wavelength division multiplexing system for automatic wavelength locking according to the present invention.

As shown in FIGS. 6 and 7, the passive wavelength division multiplexing system according to the present invention includes an optical line terminal (OLT), a plurality of optical network units (ONUs) including a light source in which a lasing wavelength of a laser is adjusted by the thermo-optic effect, and a wavelength routing network for interconnecting the optical line terminal (OLT) and the optical network unit (ONU) through a single optical line. The optical line terminal (OLT) includes an FSK Tx section 601, a first photo detection section (e.g., photo detector) 602, and a first polymer optical sub-assembly section 603, and the optical network units (ONUs) includes a second photo detection section 701, an FSK Rx section 702, and a second polymer optical sub-assembly section 703.

More specifically, the optical line terminal (OLT) includes an FSK Tx section 601 that transmits its locked wavelength information using a frequency shift keying (FSK) signal which is carried on the amplitude of payload data within a given percentage (e.g., 10%), a first photo detection section 602 that detects the intensity of a light having a specific wavelength transferred thereto from the optical network unit (ONU) through monitoring, and a first polymer optical sub-assembly section 603 that transmits the light having the specific wavelength detected by the first photo detection section 602 using a polymer optical sub-assembly.

In addition, each of the optical network units (ONUs) includes a second photo detection section 701 that receives the playload data from the optical line terminal (OLT) and converts the received playload data into an electrical signal, an FSK Rx section 702 that detects only an FSK signal from the data into the electrical signal in the second photo detection section 701 to extract the locked wavelength information, and a second polymer optical sub-assembly section 703 that transmitting a light having a specific wavelength to the optical line terminal (OLT) while tuning a wavelength based on the locked wavelength information extracted in the FSK Rx section 702.

The operation of the passive wavelength division multiplexing system for automatic wavelength locking according to the present invention having the above construction as shown in FIGS. 6 and 7 will be described hereinafter.

First, the optical line terminal (OLT) locks its wavelength to the center of a passband each channel irrespective of the optical network units (ONUs) as described above (see FIG. 3), and continues to transmit the locked wavelength information to the optical network units (ONUs) through the FSK Tx section 601.

In this case, the locked wavelength information is transmitted in a state of being carried on an FSK signal, which is carried on the amplitude of payload data within a given percentage (e.g., 10%).

Next, each of the optical network units (ONUs) receives the optical signal from the optical line terminal (OLT), and detects only an FSK signal from the received signal through the FSK Rx section 702.

By doing so, it is possible to grasp the locked optical wavelength of the received signal. That is, it is possible to grasp the number of a port of the RN, to which a current optical network unit (ONU) is connected.

Then, the transmitted wavelength of the optical network unit (ONU) is tuned to the locked specific wavelength band using the grasped wavelength information.

For reference, the wavelength tuning in this step is not precisely performed. In addition, when a wavelength of the optical network unit (ONU) is positioned in a corresponding passband of the RN, the optical line terminal (OLT) senses this irrespective of the size of the wavelength.

That is, the optical line terminal (OLT) detects the intensity of an optical signal transferred thereto from the optical network unit (ONU) through monitoring.

The monitored intensity value is transmitted in a state of being carried on the first polymer optical sub-assembly section 603 through the FSK Tx section 01 and this information is received by the optical network unit (ONU).

By virtue of this operation, when a wavelength is changed, the optical network unit (ONU) can check how the changed wavelength is received by the optical line terminal (OLT).

As a result, the optical network unit (ONU) can find a wavelength enabling the optimum reception, i.e., a wavelength of an optical signal having the maximum optical intensity based on the information transmitted from the optical line terminal (OLT), and can lock its wavelength through this process.

INDUSTRIAL APPLICABILITY

The present invention can be used in a passive wavelength division multiplexing device for automatic wavelength locking. More particularly, the present invention can be used in a passive wavelength division multiplexing device for automatic wavelength locking, in which communication quality can be maximized by securing a stable communication channel through transmission and reception of an optical signal that is always optimized irrespective of an external environment by performing wavelength locking or wavelength stabilization that adjusts a wavelength of an optical signal, which varies depending on an external environment such as a temperature change, into a wavelength of an optical signal having the maximum optical intensity in transmission and reception of an optical signal between a tunable optical transceiver (T-TRX) of an optical line terminal (OLT) and a tunable optical transceiver (T-TRX) of an optical network unit (ONU), which are included in a wavelength division multiplexing passive optical network (WDM-PON)

The invention claimed is:

1. A passive wavelength division multiplexing device for automatic wavelength locking, comprising:
    an optical multiplexer configured to allow a light having a corresponding wavelength to be outputted to one or more optical network units (ONUs) when a predetermined wavelength of a light beam inputted thereto is synchronized to a passband thereof;
    a splitter configured to split a part of the light outputted from the optical multiplexer into a plurality of light beams;
    an optical filter configured to allow the light beams splitted by the splitter to pass therethrough;
    an integrated optical receiver monitor configured to detect the intensity of the light beams that has passed through the optical filter and convert the detected light beams into electrical signals;
    a wavelength-tunable optical transmitter configured to allow a light beam having a specific wavelength to be inputted to the optical multiplexer while scanning the plurality of light beams having different wavelengths according to a temperature, and adjust a wavelength of an optical signal to be outputted to the optical network units (ONUs) through the optical multiplexer, into a wavelength of an optical signal having the maximum optical intensity to lock the wavelength using optical intensity information corresponding to the electrical signals converted by the integrated optical receiver monitor;
    an FSK Tx section configured to transmit its locked wavelength information using a frequency shift keying (FSK) signal or a subcarrier which is carried on the amplitude of payload data within a given percentage;
    a first photo detection section configured to detect the intensity of a light having a specific wavelength transferred thereto from the optical network unit (ONU) through monitoring; and
    a first polymer optical sub-assembly section configured to transmit the light having the specific wavelength detected by the first photo detection section using a polymer optical sub-assembly.

2. The passive wavelength division multiplexing device for automatic wavelength locking according to claim 1, wherein the wavelength-tunable optical transmitter comprising:
    a light scanning unit configured to allow a light beam having a specific wavelength to be inputted to the optical multiplexer while scanning a plurality of light beams having different wavelengths according to a temperature; and
    a wavelength locking unit configured to adjust a wavelength of an optical signal to be outputted to the optical network units (ONUs) through the optical multiplexer, into a wavelength of an optical signal having the maximum optical intensity to lock the wavelength using optical intensity information corresponding to the electrical signals converted by the integrated optical receiver monitor.

3. A passive wavelength division multiplexing system for automatic wavelength locking, comprising an optical line terminal (OLT), one or more optical network units (ONUs) including a light source in which a lasing wavelength of a laser is adjusted by the thermo-optic effect, and a wavelength routing network for interconnecting the optical line terminal (OLT) and the optical network units (ONUs) through a single optical line, wherein the optical line terminal (OLT) comprises:
an FSK Tx section configured to transmit its locked wavelength information using a frequency shift keying (FSK) which is carried on the amplitude of payload data within a given percentage;
a first photo detection section configured to detect the intensity of a light having a specific wavelength transferred thereto from the optical network unit (ONU) through monitoring; and
a first polymer optical sub-assembly section configured to transmit the light having the specific wavelength detected by the first photo detection section using a polymer optical sub-assembly, and
wherein each of the optical network units (ONUs) comprises:
a second photo detection section configured to receive the playload data from the optical line terminal (OLT) and convert the received playload data into an electrical signal;
an FSK Rx section configured to detect only an FSK signal from the data into the electrical signal in the second photo detection section to extract the locked wavelength information; and
a second polymer optical sub-assembly section configured to transmit a light having a specific wavelength to the optical line terminal (OLT) while tuning a wavelength based on the locked wavelength information extracted in the FSK Rx section.

* * * * *